United States Patent [19]

Kramer et al.

[11] Patent Number: 4,579,930

[45] Date of Patent: Apr. 1, 1986

[54] SOLVENT-FREE HOTMELT ADHESIVE COMPRISING A POLYESTER POLYURETHANE CONTAINING CARBOXYL AND SULFONATE GROUPS

[75] Inventors: Jürgen Kramer, Rosengarten; Horst Müller-Albrecht, Cologne, both of Fed. Rep. of Germany

[73] Assignee: Bayer Aktiengesellschaft, Leverkusen, Fed. Rep. of Germany

[21] Appl. No.: 709,280

[22] Filed: Mar. 7, 1985

[30] Foreign Application Priority Data

Mar. 10, 1984 [DE] Fed. Rep. of Germany ....... 3409183

[51] Int. Cl.⁴ .............................................. C08G 18/34
[52] U.S. Cl. .................................. 528/71; 156/331.7; 528/905
[58] Field of Search ................ 528/71, 905; 156/331.7

[56] References Cited

U.S. PATENT DOCUMENTS 4,240,861 12/1980 Meckel et al. ...................... 156/331

FOREIGN PATENT DOCUMENTS 3521 8/1979 European Pat. Off. .
1305880 2/1973 United Kingdom .

*Primary Examiner*—Maurice J. Welsh
*Attorney, Agent, or Firm*—Gene Harsh; Joseph C. Gil

[57] ABSTRACT

The invention relates to a solvent-free hotmelt adhesive based on polyester polyurethanes which are suitable for the production of composite structures and, in particular, laminated parts for the interior finishing of motor vehicles. The hotmelt adhesive is based on polyester polyurethanes which are obtained by reacting organic polyester polyols and low molecular weight diols as chain-extending agents and which are modified by the incorporation of carboxyl and sulfonate groups. In addition to these modified polyester polyurethanes, the hotmelt adhesive may also contain unmodified polyester polyurethanes and crosslinking agents. The hotmelt adhesive is preferably in the form of a film or an in situ coating on a substrate. The hotmelt adhesive is produced by known processes of the type normally used for producing the known, unmodified polyester polyurethanes.

9 Claims, No Drawings

SOLVENT-FREE HOTMELT ADHESIVE COMPRISING A POLYESTER POLYURETHANE CONTAINING CARBOXYL AND SULFONATE GROUPS

BACKGROUND OF THE INVENTION

The present invention relates to a solvent-free hotmelt adhesive based on a polyester polyurethane. The polyurethane is obtainable by reacting organic diisocyanates with preferably difunctional polyester polyols containing alcoholic hydroxyl groups and low molecular weight diols as chain-extending agents at an NCO:OH equivalent ratio of from 0.9:1 to 1.05:1.

Solvent-containing, 2-component adhesive systems based on polyurethanes, are used in the production of composite structures, such as laminated parts for the interior finishing of motor vehicles. Unfortunately, solvent-containing systems have many undesirable properties. They are toxic, difficult to handle, uneconomical and inflammable. Thus, they incur additional costs through the need for application units, extraction systems, solvent recovery systems, emission control systems, anti-explosion equipment, fire prevention equipment, and the like. Further costs are incurred by the energy required to remove and recover the solvent, by relatively high dosages, based on solids, by measures necessary to avoid toxic working environment concentrations and by the need for relatively heavy insurance. Toxicity is attributable to the fact that the solvents used have a considerable toxic potential. However, the reactive components are far more toxic (maximum allowable concentrations or MAC value <0.02 ppm). The inflammability of these adhesive systems is reflected in the fact that they are generally grouped in risk class A I, i.e., they have a flash point of <21° C. The effect of all these disadvantages is that the adhesive systems are difficult to handle. Limited pot life, exact dosage of the components, and exclusion of moisture are only a few additional problems which must be taken into account during processing.

To date, the disadvantages noted above had to be accepted because there was no other adhesive system that was able to satisfy the stringent requirements involved. These requirements include high cohesion; maximal thermal stability; resistance to migration in the bonding of flexible polyvinyl chloride; deep drawability; high adhesion to a variety of materials; and easy application.

U.S. Pat. No. 4,240,861 describes an adhesive which consists predominantly of a linear dihydroxypolyurethane containing from 0.01 to 1% by weight of carboxyl groups, and from 0.1 to 10 milliequivalents of ionic groups per 100 grams of polyurethane. The polyurethane is prepared by reacting (i) dihydroxypolyesters, (ii) organic diisocyanates, (iii) chain lengthening agents, (iv) compounds containing carboxyl groups and groups having a higher isocyanate-reactivity than carboxyl groups, and (v) compounds containing ionic groups and isocyanate-reactive groups. The compositions described therein are soluble in methyl ethyl ketone and because of the ratio of components used have relatively low urethane group contents.

In view of the above-noted disadvantages of existing adhesive systems and in view of the stringent demands stated above, the object of the present invention was to provide a solvent-free adhesive which satisfied the following requirements: activatability below the damage limit of the substrates to be bonded (generally about 130° C.); high thermal stability under tensile stressing (24 hours at 80, 90 or 120° C., depending on the application); resistance to plasticizer migration; high adhesion level; deep drawability; and satisfactory adhesion to metal surfaces.

DESCRIPTION OF THE INVENTION

According to the invention, the above-noted object is achieved through a solvent-free hotmelt adhesive based on polyester polyurethanes of the type described at the beginning which is characterized in that the polyester polyurethanes contain incorporated carboxyl and sulfonate groups and specified amounts of urethane groups.

Although the hotmelt adhesive according to the invention may of course be used for a variety of purposes and in a variety of industrial fields, particular preference is made to the use in the production of composite structures, such as laminated parts for the interior finishing of motor vehicles.

The economic, physiological and safety advantages of hotmelt and heat-sealing adhesives are familiar to the expert and are described in detail in the art. However, no adhesive systems capable of satisfying the stringent requirements stated above has ever been available for the interior finishing of motor vehicles. Surprisingly, the hotmelt adhesive according to the invention satisfies all these requirements, avoiding the disadvantages of state-of-the-art adhesive systems and utilizing the well-known advantages of hotmelt adhesives. In one preferred embodiment of the invention, the advantages of the hotmelt adhesives are complimented almost ideally by the fact that the adhesive is present in the form of a film or "in situ" coating. This considerably simplifies handling in the production of laminates or composite structures. The preferred embodiment of the hotmelt adhesive according to the invention in the form of an "in situ" coating or film on a substrate affords the major advantage that one substrate side of the laminate or composite structure to be produced is already optimally wetted so that, in the subsequent lamination process, processing time, melting energy and application pressure may be gauged to activation of the adhesive and to the wetting of the other substrate to be bonded to the first substrate. Another important advantage is that the processor does not have to stock up or carry out any other separate operations. As will become apparent, the hotmelt adhesive present in the form of an "in situ" coating on a substrate, such as flexible polyvinyl chloride foam sheet, may be directly processed in the laminator.

More particularly, the present invention is directed to a solvent-free hotmelt adhesive comprising a polyester polyurethane characterized in that the polyurethane:
(i) when mixed with methyl-ethyl ketone in a weight ratio of 85 parts of methyl-ethyl ketone to 15 parts of polyurethane does not form a solution at 20° C.;
(ii) is prepared by reacting an organic diisocyanate, a polyester polyol (preferably a polyester diol-containing alcoholic hydroxyl groups), and a low molecular weight diol, at an NCO:OH equivalent ratio of from 0.9:1 to 1.05:1;
(iii) contains from 0.01 to 1% by weight, and preferably from 0.02 to 0.6% by weight, of incorporated carboxyl groups, (iv) contains from 0.1 to 10, and preferably from 0.5 to 5, milliequivalents of incorporated sulfonate groups per 100 grams of polyurethane, and (v) contains from 4 to 20, and preferably from 6 to 16, percent by weight of urethane groups —N-H—CO—O—.

The polyester polyurethanes on which the hotmelt adhesive according to the invention is based are modifications of known segmented polyurethanes. Segmented polyurethanes generally consist of at least 3 basic components, namely (a) long-chain polyester polyol, (b) diisocyanate and (c) chain-extending agents, such as low molecular weight diols (for example, glycol), water or diamine. These segmented polyurethanes are characterized by the presence of hard and soft segments (segment structure or block copolymer structure) in the polymer chain. They are elastic products of which the secondary and tertiary structure and, hence, morphology depend upon the chemical structure and the segment or block lengths. The superior properties of these products are attributable to their two-phase or multiphase character. Typical segment polyurethanes, such as thermoplastic polyurethane elastomers (TPU), among which the modified polyester polyurethanes and the corresponding unmodified polyester polyurethanes are also included, are predominantly linear, the secondary structure being based on the close-order interaction between the hard segments. This interaction, which is also known as physical crosslinking, is frequently characterized by hydrogen bridges between opposite urethane groups, although other interactions can also play an important and, in some cases, even a critical part. Segmented polyurethanes, their structure, morphology and properties are known and described for example in Becker/Braun "Kunststoff Handbuch" Vol. 7, 2nd Edition, "Polyurethane", pages 32 to 37 and the literature cited therein.

The polyester polyurethanes on which the hotmelt adhesive according to the invention is based may be produced by any of the known methods for producing segmented polyester polyurethanes. This applies both to the polyester polyurethanes modified in accordance with the invention and also to the known unmodified polyester polyurethanes. The abovementioned equivalent ratios between isocyanate groups and hydroxyl groups and the quantitative ratios between the starting materials are maintained to obtain the above-mentioned quantities of incorporated carboxyl groups, incorporated sulfonate groups and incorporated urethane groups. Most preferably from 1 to 4 moles of diol chain-extending agents, from 0,025 to 0,3 moles of dimethylol propionic acid and from 0,025 to 0,2 moles of sulfonate diols are used per mol of polyester in the manufacture of the essential polyester polyurethanes. If only a small amount of diol chain-extending agents within the above range is used it is essential not to use a mixture of such diol chain-extending agents so that the resulting polyurethane remains insoluble in methyl-ethyl-ketone as set forth hereinbefore. Preferably a mixture of all these diols is made which is then reacted with the diisocyanate at an NCO:OH equivalent ratio of from 0,9:1 to 1,05:1. Production is preferably carried out at a temperature in the range from 50° to 220° C. and, more preferably, at a temperature in the range from 80 to 200° C. The production of the polyester polyurethanes from the starting materials mentioned below may be carried out, for example, in a single stage in the melt.

The polyester polyols used may be the known polyester polyols used for the production of polyester polyurethanes. However, it is preferred to use difunctional polyester diols containing alcoholic hydroxyl groups. Suitable polyester diols are polyester diols having average molecular weights of from 800 to 5000 and preferably from 2000 to 4000 produced from (i) dicarboxylic acids containing at least 6 carbon atoms, such as adipic acid, pimelic acid, suberic acid, azelaic acid and/or sebacic acid (preferably adipic acid, as the sole acid component) and (ii) alkane diols preferably containing at least 4 carbon atoms, such as, for example, 1,4-dihydroxy-butane, 1,5-dihydroxypentane and/or 1,6-dihydroxy-hexane. Polycondensates of ω-hydroxyalkane-mono-carboxylic acids and the polymers of their lactones are also suitable, although less preferred. Polyester diols of the type in question are commercially available or may readily be produced by known methods. The molecular weights indicated are calculated from the hydroxyl group content, experimentally determined in the usual way.

Low molecular weight diols suitable as chain-extending agents in accordance with the present invention include, in particular, aliphatic diols having average molecular weight of from 62 to 400 or mixtures thereof. Examples of such diols include ethylene glycol, 1,3-dihydroxy-propane, 1,4-dihydroxy-butane, 1,5-dihydroxypentane, 1,6-dihydroxyhexane, and the like. 1,4-dihydroxybutane and 1,6-dihydroxy-hexane or mixtures thereof are preferred chainextending agents. These compounds are also familiar to the routineer and are commercially available.

The organic diisocyanates suitable for producing the polyurethanes are also known in the art. According to the invention, aromatic diisocyanates are preferred. Thus, 4,4'-diisocyanatodiphenylmethane and 2,4- and/or 2,6-diisocyanatotoluene, for example, are preferably used. However, it is also possible to use other organic diisocyanates, such as 1,6-diisocyanatohexane.

Components containing carboxyl groups and components containing sulfonate groups are used for modifying the above-mentioned conventionally produced polyester polyurethanes in accordance with the invention. Several useful materials are described in U.S. Pat. No. 4,240,861.

Dihydroxy and trihydroxy carboxylic acids are particularly suitable for the incorporation of carboxyl groups in the polyester polyurethanes modified in accordance with the invention. Preferred examples of di- and trihydroxycarboxylic acids are di- and trimethylol propionic acid.

Organic sulfonate diols, such as for example the adducts of sodium or potassium bisulfite with unsaturated diols, such as 1,4-dihydroxybutene, or alkoxylation products (preferably propoxylation products) thereof having an average molecular weight of from 300 to 600 are particularly suitable for the incorporation of sulfonate groups in the polyester polyurethanes in accordance with the invention. The molecular weights may be calculated on the basis of the hydroxyl group content, experimentally determined in the usual way. For suitable sulfonate diols and their production, see also German Auslegeschrift No. 24 46 440.

Mixtures of the compounds suitable as starting materials may of course also be used in the production of the polyester polyurethanes in accordance with the invention. In other words, it is possible to use two or more suitable polyester diols, two or more suitable chainextending agents, two or more organic diisocyanates, two or more components containing carboxyl groups and/or two or more components containing sulfonate groups. In addition, the hotmelt adhesive according to the invention may of course also contain conventional additives, such as fillers, flameproofing agents, dyes, dehydrating agents, antistatic agents (for example, conductive carbon black), auxiliaries for improving high frequency-activation, plasticizing components (for example, where flame lamination is to be used) and lubricants or anticaking agents (the granulates can be powdered, for example, with talcum). The introduction of these additives in the correct quantities and at the right time is well known in the art.

As mentioned above, the polyester polyurethanes of the invention and the unmodified polyester polyurethanes known in the art are produced in exactly the same way, except that components containing carboxyl groups and components containing sulfonate groups are used in the production of the polyester polyurethanes in accordance with the invention.

From 0.2 to 1.5 moles and preferably from 0.6 to 1.0 moles of chain-extending agent per mole of polyester diol are used in the production of the unmodified polyester polyurethanes.

In one preferred embodiment, the hotmelt adhesive according to the invention contains in addition to the polyester polyurethanes of the invention, unmodified polyester polyurethanes. Particulars of known, unmodified polyester polyurethanes suitable for use in accordance with the invention can be found, for example, in German Auslegeschriften No. 19 30 226 and 21 61 340 and British Pat. No. 970,379. The ratio by weight of polyester urethanes in accordance with the invention to unmodified polyester urethanes preferably amounts to between 10:1 and 1:10 and, more particularly, to between 4:1 and 1:4. The unmodified, commercially available polyester polyurethanes which can be used have a high solution viscosity in methyl-ethyl ketones (MEK), a pronounced tendency towards crystallization and a comparatively low thermoplasticity. Thus, one such unmodified polyester polyurethane which has been successfully used has a solution viscosity of, from 1 to 1.5 Pas (15% in MEK, Brookfield LVF viscosimeter, spindle 3, 60 r.p.m., room temperature). By contrast, the modified polyester polyurethanes of the invention are insoluble in MEK and have a higher melting point and a higher proportion of hard segment domains.

To enhance the physical crosslinking of the polyester polyurethanes (both modified and also unmodified), di- and/or trifunctional isocyanates may be additionally incorporated as chemical crosslinking agents, more particularly in a quantity of from 0.1 to 5% by weight. These isocyanates may also be present in masked form (for example, masked with nonyl phenol). Good results can be obtained, for example, with diphenylmethane-4,4'-diisocyanate and thiophosphoric acid-tris-(p-isocyanatophenylester) and with dimeric tolylene diisocyanate.

Where they are produced in a single stage in the melt as described above, the polyester polyurethanes modified in accordance with the invention and, likewise, the unmodified polyester polyurethanes are obtained in the form of a solidified melt after cooling. The melt obtained is granulated in the usual way. The granulate(s), which may optionally contain the above-noted additional additives, optionally in conjunction with crosslinking agents and any additives where they are not already present in the granulates, are extruded to form films, "in situ" coatings, strips, webs, sheets, tapes and the like. The particularly preferred form of the hotmelt adhesive according to the invention is as a film (adhesive film) or "in situ" coating or film on a substrate. Extrusion of the starting materials forming the hotmelt adhesive according to the invention may be carried out in the usual way, as described for example in Becker/Braun "Kunststoff Handbuch", Vol. 7, 2nd Edition, Polyurethane, pages 433 et seq. The known chill-roll process, for example, has proved to be suitable for producing the hotmelt adhesive according to the invention in film form as described for example, in Saechtling "Kunststoff Taschenbuch", 21st Edition, 1979, pages 130–160, and more particularly page 156. Where the hotmelt adhesive is produced in film form, a film liner of polyethylene serving as a release film may optionally be run in before the chill rolls or during winding into rolls.

Instead of producing the hotmelt adhesive in the form of a film, it is even better in many cases to produce the hotmelt adhesive in the form of an in situ coating on a substrate, the substrate being one of the laminate layers of the composite structure to be subsequently produced. In this embodiment, the starting materials are directly extruded onto one side of the substrate. This technique is also known in the art.

Blown film and flat sheet extrusion are mentioned as examples of suitable extrusion processes for producing the hotmelt adhesive according to the invention in the form of a film or "in situ" coating. Where the chill-roll process is used, the substrate may be used as a liner film to obtain the required "in situ" coating.

In addition to the preferred embodiments mentioned above, the hotmelt adhesive according to the invention may of course also be used in powder form. In that case, application is carried out by scattering the powder-form hotmelt adhesive onto a substrate (for example a textile substrate), and passing the substrate thus treated through an infrared tunnel so that the powder-form hotmelt adhesive is readily sintered on the substrate. The substrate thus coated with the hotmelt adhesive according to the invention may then be used for the production of composite structures.

As already mentioned, the hotmelt adhesive according to the invention, aside from many other potential applications, may be used with particular advantage in the production of composite structures and, more particularly laminated parts for the interior finishing of motor vehicles. In this connection, the hotmelt adhesive according to the invention may be used as a vacuum-deep-drawable, deep-draw-formable or vacuum-deep-draw-formable film or "in situ" coating for the production of moldings laminated with flexible polyvinyl chloride foam (F-PVC) films, polyurethane (PU) foam, PU/F-PVC foam, polysytrene-foam, acrylonitrile-butadiene-styrene foam, leather, textile or similar substrates for use as, for example, roof linings, side panel elements, control panel elements, glove box parts, passenger compartment and dash-board parts. The vacuum deep drawing, deep-draw forming or vacuum deep-draw forming process used for the production of these moldings is known, is widely applied in practice, including a number of variations and is described for example, in Saechtling "Kunststoff Taschenbuch", 21st Edition, 1979, pages 140 to 184 (more particularly page 168), and Wittfoht "Kunststofftechnisches Worterbuch", Part 3, 1978, pages 167 et seq. In addition, the hotmelt adhesive according to the invention, by virtue of its firm adhesion to metallic substrates, may be used for the direct application of films, side panels, and the like. The hotmelt adhesive according to the invention is particularly suitable for those applications when it is already present as an "in situ" coating.

In addition to the usual heat activation processes (for example, infrared irradiation, contact heat, and the like), activation of the hotmelt adhesive according to the invention may also be carried out by heating in a high-frequency alternating field.

The invention is further illustrated but is not intended to be limited by the following examples in which all parts and percentages are by weight unless otherwise specified.

EXAMPLES

EXAMPLE 1

Production of unmodified polyester polyurethanes

A mixture of 1 mole of a polyester diol (molecular weight 2250) of adipic acid and 1,6-di-hydroxy-hexane, 0.45 mole of 1,4-dihydroxybutane and 0.45 mole of 1,6-dihydroxyhexane was stirred at 100° C. with 1.88 moles of 4,4'-diisocyanatodiphenylmethane. The homogeneous mixture thus obtained was then poured into a metal box and kept at 140° C. for 16 hours. The polyester polyurethane formed was then granulated after cooling.

EXAMPLE 2

Production of polyester polyurethanes modified in accordance with the invention

1 Mole of the polyester diol mentioned in Example 1, 3 moles of 1,4-dihydroxybutane, 1 mole of 1,6-dihydroxyhexane, 0.3 mole of dimethylol propionic acid and 0.2 mole of the propoxylated adduct of sodium bisulfite with 1,4-dihydroxybutene (molecular weight 400) was stirred at 100° C. The mixture was poured into a metal box and kept at 140° C. for 16 hours to form a polyester urethane. The product was granulated after cooling. The polyester urethane obtained contained 15.6% by weight of urethane groups —NH—CO—O—, 0.32% by weight of carboxyl groups and 4.8 milliequivalents per 100 g of solids of sulfonate groups.

EXAMPLE 3

Following the technique of Example 2, 1 mole of a polyester diol (molecular weight 3000) of adipic acid and 1,6-hexane diol, 1 mole of 1,4-dihydroxybutane, 0.025 mole of dimethylol propionic acid, 0.025 mole of the sulfonate diol described in Example 2 and 2.03 mole of 4,4'-diisocyanatodiphenylmethane were reacted to form a polyester polyurethane which was granulated after cooling. The polyester polyurethane obtained contained 0.03% by weight of carboxyl groups, 6.7% by weight of urethane groups and 0.7 milliequivalents per 100 g of solids of sulfonate groups.

EXAMPLE 4

Production of a hotmelt adhesive according to the invention 80 parts by weight of the granulate of Example 1 and 20 parts by weight of the granulate of Example 2 were prehomogenized by hand in a mixing vessel and introduced into the feed hopper of a single-screw extruder. The temperature in the extruder ranged from 190° to 220° C.

Extruder data

Screw: 20 D
Diameter: 100 mm
Compression: 1:3
Motor output: 34 kW, 72 A

Films having a thickness of 50, 100 and 150 μm were produced by the chill-roll process. A liner film of polyethylene serving as a release film was run in during winding into rolls.

In the same way, the material introduced into the extruder was directly extruded onto various substrates (see Examples 5 and 6) which were used as liner films.

EXAMPLE 5

Vacuum deep drawing lamination

Laminated moldings of supports of molded fiber board, ABS/PVC, and PC/ABS were laminated with the hotmelt adhesive of Example 4, present in the form of an "in situ" coating on a substrate. In each case 3 parallel tests were carried out using coatings having a thickness of 50, 100 resp. 150μm. Soft PVC-foam and soft PVC/ABS-foam sheets having each a thickness of about 3 mm were used as the substrates. A laboratory vacuum deep drawing apparatus was used for producing laminated moldings. To that end, the support was placed on a support mold. From the coating side, the film was heated by infrared heaters to about 130° C., inflated like a balloon, arranged over the support and then deep drawn by vacuum via the support. If the support materials were not permeable to air, holes were drilled through them in such a way that enough suction could be applied at places where there were significant geometric changes from the film to the molding, so that the support could be thoroughly wetted by the adhesive.

It was surprisingly found that the laminated moldings thus produced satisfied all the requirements imposed on the bond line. In particular, no separation occurred after storage for 24 hours at 90° C. in a heating cabinet.

These laboratory tests were repeated in pilot and production plants and produced the same positive results.

EXAMPLE 6

Deep-draw forming lamination

The hotmelt adhesive produced in the form of an "in situ" coating in accordance with Example 4 and having a thickness of about 50 μm and a soft PVC-foam film having a thickness of about 3 mm serving as a substrate, was subsequently treated with a needle cushion in such a way that a perforated coating was formed over the entire surface. The film thus treated was clamped in a frame and, from the adhesive-coated side, was heated by infrared heating to about 130° C. A sheet of expanded polystyrene-foam (EPS-foam) was preheated to about 140° C. in a second frame. The parts were then placed in a deep-drawing press so that a molding based on a support of deep-drawn EPS-foam with a deep-drawn soft PVC foam film laminated therewith was formed in a single operation.

It was surprisingly found that the moldings thus produced satisfied the requirements which vacuumdeep-drawn moldings also have to satisfy, i.e. in particular there was no separation along the bond line after storage for 24 hours at 90° C. in a heating cabinet.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A solvent-free hotmelt adhesive comprising a polyester polyurethane characterized in that said polyester polyurethane:

(i) when mixed with methyl-ethyl-ketone in a weight ratio of 85 parts of a methyl-ethyl-ketone to 15 parts of polyester polyurethane does not form a solution at 20° C.;

(ii) is prepared by reacting an organic diisocyanate, a polyester polyol, from 1 to 4 moles of low molecular weight diol per mole of polyester, from 0.025 to 0.3 moles of dimethylol propionic acid per mole of polyester, and from 0.025 to 0.2 moles of sulfonate diols per mole of polyester, at an NCO:OH equivalent ratio of from 0.9:1 to 1.05:1;

(iii) contains from 0.01 to 1% by weight of carboxyl groups;

(iv) contains from 0.1 to 10 milliequivalent of sulfonate groups per 100 grams of polyurethane, and (v) contains from 4 to 20% by weight of urethane groups.

2. The adhesive of claim 1 wherein the polyester polyol used to prepare the polyester polyurethane is a polyester diol containing alcoholic hydroxyl groups.

3. The adhesive of claim 1 where (iii) the amount of carboxyl groups is from 0.02 to 0.6% by weight, (iv) the amount of sulfonate groups is from 0.5 to 5 milliequivalents, and (v) the amount of urethane groups is from 6 to 16% by weight.

4. The adhesive of claim 1 further comprising a polyester polyurethane free from carboxyl and sulfonate groups produced by reacting organic diisocyanates with polyester polyols and low molecular weight diols at an NCO:OH equivalent ratio of from 0.9:1 to 1.05:1, with from 0.2 to 1.5 moles of diol being used per mole of polyester polyol, with said adhesive further characterized in that the weight ratio of polyester polyurethanes containing carboxyl and sulfonate groups to polyester polyurethane free from such groups is from 10:1 to 1:10.

5. The adhesive of claim 4 wherein the weight ratio of said polyurethanes is from 4:1 to 1:4.

6. The adhesive of claim 1 in the form of a film.

7. The adhesive of claim 1 in the form of an in situ coating on a substrate.

8. In the production of composite structures using a hotmelt adhesive, the improvement wherein the adhesive is the adhesive of claim 1.

9. In the production of composite structures using a hotmelt adhesive by vacuum deep drawing, deep-draw forming or vacuum deep-draw forming, the improvement wherein the adhesive is the adhesive of claim 1.

* * * * *

UNITED STATES PATENT AND TRADEMARK OFFICE
CERTIFICATE OF CORRECTION

PATENT NO. : 4,579,930
DATED : April 1, 1986
INVENTOR(S) : Jürgen Krämer and Horst Müller-Albrecht It is certified that error appears in the above—identified patent and that said Letters Patent is hereby corrected as shown below:

First page, block 73 - please correct the Assignee to read:

Bayer Aktiengesellschaft
Leverkusen, Federal Republic of Germany AND

Beiersdorf AG
Hamburg, Federal Republic of Germany

Signed and Sealed this

Twelfth Day of August 1986

[SEAL]

Attest:

Attesting Officer

DONALD J. QUIGG

Commissioner of Patents and Trademarks